United States Patent [19]
Lawson et al.

[11] 4,383,071
[45] May 10, 1983

[54] FLAME AND SMOKE RETARDANT ELASTOMERS FORMED BY GRAFTING VINYLIDENE CHLORIDE ON DIENE/BUTYL ACRYLATE COPOLYMERS

[75] Inventors: David F. Lawson, Uniontown; Robert A. Hayes, Cuyahoga Falls; Alan G. Altenau, Hudson, all of Ohio

[73] Assignee: The Firestone Tire & Rubber Company, Akron, Ohio

[21] Appl. No.: 260,477

[22] Filed: May 4, 1981

[51] Int. Cl.$^3$ ................. C08K 3/22; C08F 279/02
[52] U.S. Cl. ........................... 524/432; 524/433; 524/436; 524/437; 525/317
[58] Field of Search ............ 260/45.7 R; 525/308, 525/317, 83; 526/329.1; 524/433, 436, 432, 437

[56] References Cited

U.S. PATENT DOCUMENTS

| | | | |
|---|---|---|---|
| 2,463,575 | 3/1949 | Stanton et al. | 526/329.1 |
| 2,744,099 | 5/1956 | Mitchell et al. | 526/329.1 |
| 3,281,345 | 10/1966 | Kuhne et al. | 525/83 |
| 3,988,393 | 10/1976 | Gallagher | 260/29.7 UA |
| 4,143,011 | 3/1979 | Hisazumi et al. | 525/317 |
| 4,187,202 | 2/1980 | Kondo et al. | 525/302 |
| 4,192,828 | 3/1980 | Witschard | 525/83 |

FOREIGN PATENT DOCUMENTS 1534628 6/1968 France .
41-8959 5/1966 Japan ................... 525/308

Primary Examiner—V. P. Hoke

[57] ABSTRACT

An elastomeric flame and smoke retardant graft copolymer consisting essentially of a backbone copolymer derived from a conjugated diene and butyl acrylate and a side chain polymer derived from vinylidene chloride is prepared by polymerization under emulsion conditions. The graft copolymer may contain from 10 to 70 percent by weight of units derived from the conjugated diene, from 5 to 40 percent by weight of units derived from butyl acrylate and from 15 to 75 percent by weight of units derived from vinylidene chloride. In addition to excellent flame and smoke retardant characteristics, the graft copolymer exhibits excellent low temperature flexibility. The graft copolymers can be utilized in applications such as cushioning, insulation and coating applications where such characteristics are of major importance.

7 Claims, No Drawings

FLAME AND SMOKE RETARDANT ELASTOMERS FORMED BY GRAFTING VINYLIDENE CHLORIDE ON DIENE/BUTYL ACRYLATE COPOLYMERS

BACKGROUND OF THE INVENTION

The invention relates to an elastomeric flame and smoke retardant graft copolymer having excellent low temperature flexibility. More particularly, the invention relates to an elastomeric, flame and smoke retardant graft copolymer having excellent low temperature flexibility which consists of a backbone copolymer derived from a conjugated diene and butyl acrylate and a side chain polymer derived from vinylidene chloride.

Graft copolymers having some similarity in composition or structure to those of the present invention have been described in the prior art. Thus, French Pat. No. 1,276,804 to Michel and Peyrade (1962) discloses the preparation in emulsion of a graft copolymer consisting of a vinyl polymer backbone (i.e., polyvinyl chloride), and a side chain polymer derived from 1,3-butadiene or a mixture of 1,3-butadiene and a vinyl monomer such as methyl methacrylate.

French Pat. No. 1,534,628 assigned to CIBA Limited (1968) discloses the preparation in emulsion of a graft copolymer consisting of a copolymer backbone derived from 1,3-butadiene and a vinyl monomer such as styrene, acrylonitrile, methyl methacrylate or alpha-methylstyrene and a side chain copolymer derived from acrolein, an alkyl acrylate and another vinyl monomer such as vinylidene chloride or vinyl acetate.

U.S.S.R. No. 219,201 to Fridland, et al (1968) discloses the preparation in emulsion of a graft copolymer consisting of a copolymer backbone derived from 1,3-butadiene and vinylidene chloride and a side chain copolymer derived from 1,3-butadiene and vinyl pyridine or betachloroethyl methacrylate.

U.S. Pat. No. 4,187,202 to Kondo, et al discloses the preparation in emulsion of graft copolymers consisting of a rubbery backbone polymer such as natural rubber, styrene-butadiene copolymer, acrylonitrile-butadiene copolymer, isoprene, chloroprene, acrylic rubber, ethylenepropylene-diene terpolymers, and ethylene-vinyl acetate copolymer and a side chain polymer or copolymer derived from vinyl, vinylidene (e.g., vinylidene chloride) and vinylene monomers or mixtures thereof.

While, as mentioned heretofore, the above prior art patents disclose graft copolymers which are somewhat similar in composition or structure to the graft copolymers of this invention, they do not disclose graft copolymers having the specific composition and structure of the graft copolymers of the present invention. Moreover, none of the aforementioned prior art patents disclose or suggest that the graft copolymers described therein exhibit the combination of flame and smoke retardant characteristics and low temperature flexibility which are extremely important characteristics of the graft copolymers of this invention.

SUMMARY OF THE INVENTION

In accordance with the present invention, an elastomeric graft copolymer is provided which exhibits excellent flame and smoke retardant properties and excellent low temperature flexibility.

The graft copolymer is prepared by a two-step emulsion polymerization process. In the first step, a backbone copolymer is prepared by emulsion polymerization of a conjugated diene monomer and butyl acrylate. In the second step, a side chain polymer is grafted onto the backbone copolymer by emulsion polymerization of vinylidene chloride in the presence of the backbone copolymer.

The graft copolymer of the invention may contain from 10 to 70 percent by weight of units derived from the conjugated diene, from 5 to 40 percent by weight of units derived from butyl acrylate and from 15 to 75 percent by weight of units derived from vinylidene chloride. These graft copolymers can be formulated with various special purpose additives to prepare compounds which may be utilized in flame and smoke retardant applications such as for cushioning, coatings, insulation and the like.

DETAILED DESCRIPTION OF THE INVENTION

As indicated above, the graft copolymers of the invention may contain from 10 to 70 percent by weight of units derived from the conjugated diene, from 5 to 40 percent by weight of units derived from butyl acrylate and from 15 to 75 percent by weight of units derived from vinylidene chloride. Preferred graft copolymers are those containing from 10 to 55 percent by weight of units derived from the conjugated diene, from 10 to 30 percent by weight of units derived from butyl acrylate and from 30 to 60 percent by weight of units derived from vinylidene chloride. Especially preferred graft copolymers are those containing from 30 to 55 percent by weight of units derived from the conjugated diene, from 10 to 20 percent by weight of units derived from butyl acrylate and 30–50 percent by weight of units derived from vinylidene chloride.

As also mentioned heretofore, the graft copolymers of the present invention consist of a backbone copolymer derived from a conjugated diene and butyl acrylate and a side chain polymer derived from vinylidene chloride.

Conjugated dienes which may be employed in preparing the backbone copolymers include 1,3-butadiene, isoprene, 2,3-dimethyl-butadiene, 2-phenylbutadiene, 2-chloro-butadiene, 1,3-pentadiene and the like. The preferred conjugated dienes are 1,3-butadiene, isoprene and 2-chloro-butadiene.

The graft copolymers are prepared by a two-step emulsion polymerization process. In the first step, the backbone copolymer is prepared by copolymerizing the conjugated diene monomer and butyl acrylate monomer in emulsion. In the second step, the side chain polymer is grafted onto the backbone copolymer by polymerizing vinylidene chloride in the presence of the backbone copolymer under emulsion conditions.

The graft copolymers herein can be prepared utilizing any of the conventional emulsion polymerization processes heretofore employed in the polymerization art. Thus, the graft copolymers can be prepared by emulsion polymerization of the monomers in aqueous medium using various known surfactants, initiators, chain transfer agents, buffers and optionally sequestering agents.

Suitable surfactants which may be employed include anionic surfactants such as the alkali metal salts of alkyl sulfates, alkylaryl sulfonates and alkyl sulfonates. In some instances, it may be desirable to employ a nonionic surfactant such as polyoxyethylene alkyl ether, a polyoxyethylene alkylphenol ether or as fatty acid ether of polyethylene glycol in combination with the anionic surfactant. In addition, cationic surfactants such as the quaternary alkyl ammonium salts as illustrated by cetyl trimethyl ammonium chloride may be utilized in certain cases. The preferred surfactants are anionic surfactants and of these the alkali metal salts of alkyl sulfates such as sodium lauryl sulfate are particularly preferred.

Suitable initiators which may be employed include free radical yielding initiators such as the alkali persulfates, percarbonates, perborates and the like; organic peroxides such as acetyl peroxide, benzoyl peroxide, p-chlorobenzoyl peroxide, t-butyl perbenzoate, lauryl peroxide and the like; organic hydroperoxides such as butyl hydroperoxide, cumene hydroperoxide, diisopropylbenzene hydroperoxide and the like and azo compounds such as azobis(isobutyronitrile), diazothioether and the like. In addition, a redox initiator system may be utilized in combination with suitable reducing agents such as alkali metal sulfites, bisulfites, metabisulfites, thiosulfites, dithionites and the like.

Suitable chain transfer agents which may be employed include mercaptans such as n-dodecyl mercaptan, t-dodecyl mercaptan, p-octyl mercaptan, 2-mercaptoethanol, isooctyl mercaptopropionate, 3-mercaptopropionic acid and the like. The preferred chain transfer agent for use in the process is n-dodecyl mercaptan.

Suitable buffering agents which may be employed include alkali metal phosphates such as $Na_2HPO_4$, $Na_3PO_4$, $Na_4P_2O_7$ and the like and alkali metal borates such as perborates such as $Na_2B_4O_7.10H_2O$, $NaBO_2$, $NaBO_3.H_2O$, $NaBO_2.3H_2O.H_2O_2$ and the like. Various other known buffering agents such as the carbonates and bicarbonates may also be utilized. The preferred buffering agent is $Na_2HPO_4$. As indicated above, sequestering agents may optionally be employed in the process.

Suitable sequestering agents which may be employed include essentially any of the sequestering agents utilized heretofore by those skilled in the emulsion polymerization art. The preferred sequestering agents for use in the present process are the ammonium, potassium and sodium salts of ethylenediaminetetraacetate (hereinafter EDTA salts).

The amounts of surfactants, initiators, chain transfer agents, buffers and optionally, sequestering agents employed in the emulsion polymerization process can be varied considerably to achieve desired results. In general, the amounts of such compounds employed in the present process are conventional amounts utilized in standard emulsion polymerization processes. Typical amounts of such compounds which may be employed are illustrated in the examples which follow.

As mentioned heretofore, the graft copolymers of the invention are prepared by emulsion polymerization of the monomers in aqueous medium. At least 40 percent and preferably from 50 to 70 percent of the total polymerization mass consists of water which is the supporting medium for the emulsified particles of monomer and ultimately of polymer products. The remainder of the reaction mass comprises the monomer mixture which may be as much as 60 percent by weight but is generally no more than about 35 percent of the mass. Also present are a surfactant, an initiator, a buffering agent, a chain transfer agent and optionally, a sequestering agent of the type described above.

The polymerization may be conducted at temperatures ranging from about 5° C. to about 70° C., preferably from room temperature to 60° C. The polymerization is ordinarily carried out at atmospheric pressure, but if desired, may be carried out under autogeneous pressures of 100 psig or less. Polymerization times will depend on the particular conditions of temperature and pressure employed and the degree of conversion desired.

The elastomeric, flame and smoke retardant graft copolymers of the invention may be compounded with various special purpose additives such as flame retardant fillers, smoke suppressants, plasticizers, crosslinking agents, promoters and the like. Illustrative of flame retardant and smoke suppressant additives which may be employed are compounds such as alumina trihydrate, magnesium oxide, zinc oxide, magnesium hydroxide and the like. Mixtures of the flame retardant and smoke suppressant additives may also be utilized.

The flame retardant characteristics of the graft copolymers of the invention were determined by the well known Oxygen Index (OI) test and the smoke characteristics of the interpolymers were determined by the well known Smoke Density Test.

OI is the abbreviation for Oxygen Index which is defined as the minimum volume percent oxygen content required in an oxygen/nitrogen mixture to maintain combustion of a vertical, top-lighted test specimen. The value is expressed in mathematical terms as follows:

$$OI = \frac{[O_2]}{[O_2] + [N_2]} \times 100$$

where $[O_2]$ is the volume of oxygen and $[N_2]$ is the volume of nitrogen. The OI is considered to be an accurate, reproducible determination of the flammability of materials. From a practical standpoint, an OI value of greater than 25 generally means that the test specimen will be self-extinguishing. For a more detailed discussion of the OI and method of determination, C. P. Fenimore and F. R. Martin's article in *Combustion and Flame* 10 No. 2, page 135 (1966), should be consulted.

NATIONAL BUREAU OF STANDARDS SMOKE DENSITY CHAMBER

Evaluations for the density of visible smoke were made using a commercial smoke density chamber modeled after one developed at the National Bureau of Standards by the Fire Research Group (see D. Gross, J. J. Loftus and A. F. Robertson, ASTM Special Technical Publication 422 pages 166-204 (1969)). This chamber contains a radiant heater producing 2.5 W/cm² of heat at the surface of a 3×3 inches sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as Specific Optical Density, $D_s$, where $D_s = (V/AL)\log_{10}(T_o/T) = 132 \log_{10}(T_o/T)$ V = volume of chamber
A = area of test specimen
L = Length of light path
$T_o$ = initial light transmittance through the chamber
T = transmittance of light during test.

At the peak of smoke build-up $D_s = D_m$ and for purposes of the report, corrected maximum smoke is recorded as $D_{mc}=D_m-D_c$ where $D_c$ is the clear beam specific optical density occurring after the smoke test, when the chamber has been exhausted of smoke. Lower values of $D_{mc}$ indicate less obscuration of light due to smoke.

In the examples, the $D_{mc}$ values were normalized for sample mass by dividing $D_{mc}$ by the mass of the sample. The result is expressed as the smoke yield per gram: Dm/g.

The following examples are submitted for the purpose of further illustrating the nature of the present invention and should not be regarded as a limitation on the scope thereof. Parts and percentages shown in the examples are by weight unless otherwise indicated.

EXAMPLE 1

To a 28 ounce glass vessel equipped with heating means, thermometer, nitrogen inlet and rubber septum was charged 150 milliliters (ml) of deaerated, deionized water, 10.0 grams of sodium lauryl sulfate, 10 ml of a 3% $K_2S_2O_8$ solution, 0.25 ml of n-dodecyl mercaptan, 33.0 grams of butyl acrylate and 67.0 grams of 1,3-butadiene. The resultant reaction mixture was then heated for 3 hours at 50° C. to effect polymerization. The polymerization reaction was terminated at this point by adding 12 ml of 3% dithionite. Following termination of the polymerization, the vessel was vented and purged with nitrogen, then opened and permitted to stand for four (4) hours to allow evaporation of excess 1,3-butadiene. The resulting butadiene/butyl acrylate copolymer latex was found to contain 25.9% solids indicating a conversion of 60%. Infrared analysis (IR) of the copolymer showed that it contained 76% butadiene and 24% butyl acrylate.

A graft copolymer was prepared from this latex under similar emulsion conditions by adding 10 ml of 3% $K_2S_2O_8$, 20 ml of 0.05 F $Na_2HPO_4$ and 25 grams of vinylidene chloride to 100 grams of latex. The resultant mixture was agitated overnight at 5° C. and then polymerized at 50° C. for 1 hour. Following this period, the polymerization was terminated by adding 6 ml of 3% dithionite. Then, the graft copolymer was recovered by coagulation in 1000 ml of isopropyl alcohol containing 2 grams of di-t-butyl-p-cresol. The graft copolymer was strained through cheesecloth, air-dried and vacuum dried at 50° C. The graft copolymer exhibited a single glass transition temperature, Tg, of −63° C. and was found by IR analysis to contain 39.6% by weight of butadiene, 18.4% by weight of butyl acrylate and 41.9% by weight of vinylidene chloride.

EXAMPLE 2

To a 28 ounce glass vessel equipped with heating means, thermometer, nitrogen inlet, and rubber septum was charged 150 ml of deaerated, deionized water, 10.0 grams of sodium lauryl sulfate, 10 ml of a 3% $K_2S_2O_8$ solution, 0.25 ml of n-dodecyl mercaptan, 20.0 grams of butyl acrylate and 80.0 grams of 1,3-butadiene. The reaction mixture was then heated for 3 hours at 50° C. to effect polymerization. At this point, polymerization was terminated by adding 12 ml of 3% dithionite. Following termination of the polymerization, the vessel was vented and purged with nitrogen, then opened and permitted to stand for four (4) hours to allow evaporation of excess 1,3-butadiene. The resulting butadiene/butyl acrylate copolymer latex was found to contain 21.3% solids indicating a conversion of 46%. Infrared analysis of the copolymer showed that it contained 84% butadiene and 16% butyl acrylate.

A graft copolymer was prepared from this latex in a manner similar to that of Example 1 by adding 10 ml of 3% $K_2S_2O_8$, 20 ml of 0.05 F $Na_2HPO_4$ and 25 grams of vinylidene chloride to 100 grams of latex. The resultant mixture was agitated overnight at 5° C. and then polymerized at 50° C. for 5 hours. Following this period, the polymerization was terminated by adding 6 ml of 3% dithionite. Then, the graft copolymer was recovered by coagulation in 1000 ml of isopropyl alcohol containing 2 grams of di-t-butyl-p-cresol. The graft copolymer was strained through cheesecloth, air-dried and vacuum dried at 50° C. The graft copolymer was found by IR analysis to contain 38% butadiene, 18.3% butyl acrylate and 43.7% vinylidene chloride.

EXAMPLE 3

In this example, a graft copolymer was prepared utilizing substantially the same procedure set forth in Example 2 except that the butadiene/acrylate copolymerization was run for 5 hours, and used 0.5 ml. of n-dodecyl mercaptan. The latex base contained 26.6% rubber. Equal weights of the rubber (dry basis) and vinylidene chloride were copolymerized as in Example 2, except that the mixtures were held at 50° C. for only 1 hour. The resultant graft copolymer which was obtained in 77% conversion was found by IR analysis to contain 50.1% butadiene, 11.8% butyl acrylate and 38.1% vinylidene chloride. The graft copolymer showed a single glass transition temperature in 2 separate tests of −74.5° C. and −76.5° C. respectively.

The following examples (i.e., 4 and 5) illustrate the flame retardant and smoke suppressant characteristics of the graft copolymers of the invention. For comparative purposes, the flame and smoke characteristics of a standard polybutadiene polymer are included.

EXAMPLES 4–5

In examples 4 and 5, the graft copolymers of examples 2 and 3 were compounded with flame retardant additives, smoke suppressant additives, curing agents and other special purpose additives to prepare the test compounds. A control compound was prepared by compounding a standard polybutadiene polymer with flame retardant additives, smoke suppressant additives, curing agents and other special purpose additives.

The control and test formulations were as follows:

| | Ex. No. Parts by Weight | | |
|---|---|---|---|
| Ingredients | Control | 4 | 5 |
| Polybutadiene | 100.0 | — | — |
| Graft Copolymer of Ex. 2 | — | 100.0 | — |
| Graft Copolymer of Ex. 3 | — | — | 100.0 |
| Alumina Trihydrate | 100.0 | 100.0 | 100.0 |
| Magnesium Oxide | — | 5.0 | 5.0 |
| Zinc Oxide | 2.0 | 0.5 | 0.5 |
| Methyl Tuads* | — | 1.0 | 1.0 |
| Ethylene Thiourea | — | 0.5 | 0.5 |
| Sulfur | 2.0 | — | — |
| Stearic Acid | 2.0 | — | — |
| Cyclex B** | 2.0 | — | — |
| Total | 208.0 | 207.0 | 207.0 |

*tetramethylthiuram disulfide
**N—t-butyl-1,2-benzothiazole sulfenamide

The control formulation above was cured for 25 minutes at 300° F., while the test formulations (examples 4 and 5) were cured for 25 minutes at 260° F. The cured compounds were then evaluated for flame retardant and smoke suppressant characteristics using the NBS Smoke Density and Oxygen Index procedures described above. Test results are shown in the Table.

TABLE

| Ex. No. | NBS Smoke Density Dm/g(F) | Dm/g(NF) | Oxygen Index |
|---|---|---|---|
| Control | 31.5 | 19.8 | 22–23 |
| 4 | 22.8 | 11.8 | 31.0–31.5 |
| 5 | 16.0 | 7.5 | 33.0–33.5 |

(F) = flaming mode
(NF) = non-flaming or smoldering mode

As indicated by the above results, formulations containing the graft copolymers of the invention exhibit superior flame and smoke properties.

We claim:

1. An elastomeric flame and smoke retardant graft copolymer, having excellent low temperature flexibility, consisting essentially of:
    (a) a backbone copolymer derived from a conjugated diene and butyl acrylate; and
    (b) a side chain polymer derived from vinylidene chloride; wherein the graft copolymer contains from 10 to 70 percent by weight of units derived from a conjugated diene, from 5 to 40 percent by weight of units derived from butyl acrylate and from 15 to 75 percent by weight of units derived from vinylidene chloride.

2. The graft copolymer of claim 1 wherein said conjugated diene is selected from the group consisting of 1,3-butadiene, isoprene and 2-chlorobutadiene.

3. The graft copolymer of claim 1 wherein said conjugated diene is 1,3-butadiene.

4. An elastomeric flame and smoke retardant polymeric composition comprising:
    (a) a graft copolymer, having excellent low temperature flexibility, consisting essentially of a backbone copolymer derived from a conjugated diene and butyl acrylate and a side chain polymer derived from vinylidene chloride; wherein the graft copolymer contains from 10 to 70 percent by weight of units derived from a conjugated diene, from 5 to 40 percent by weight of units derived from butyl acrylate and from 15 to 75 percent by weight of units derived from vinylidene chloride; and
    (b) special purpose additives selected from the group consisting of flame retardant additives, smoke suppressant additives, plasticizers, crosslinking agents and promoters.

5. The polymeric composition of claim 4 wherein said conjugated diene is selected from the group consisting of 1,3-butadiene, isoprene and 2-chlorobutadiene.

6. The polymeric composition of claim 4 wherein said conjugated diene is 1,3-butadiene.

7. The polymeric composition of claim 4 wherein said flame retardant and smoke suppressant additives are selected from the group consisting of alumina trihydrate, magnesium oxide, magnesium hydroxide and zinc oxide and mixtures thereof.

* * * * *